UNITED STATES PATENT OFFICE.

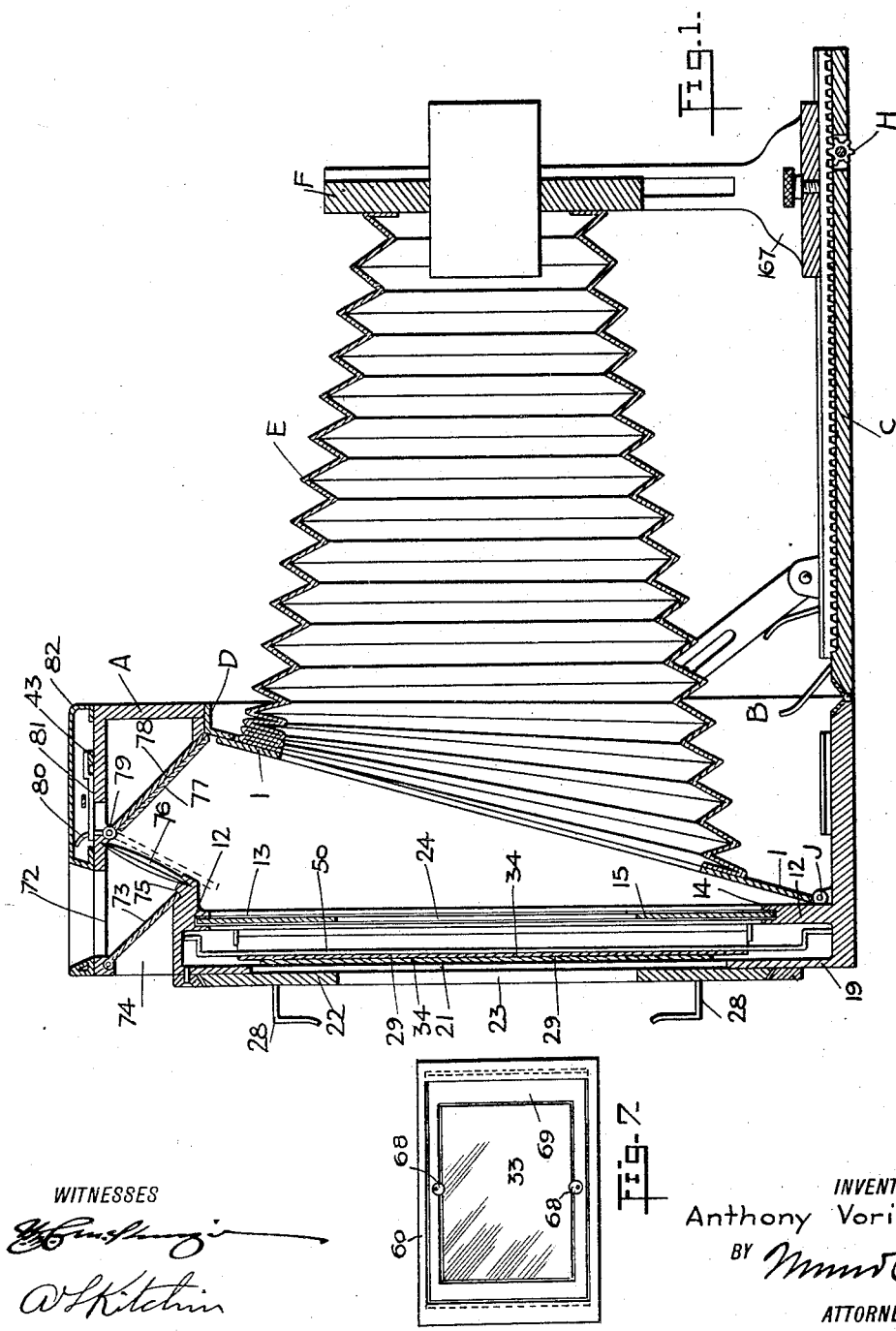

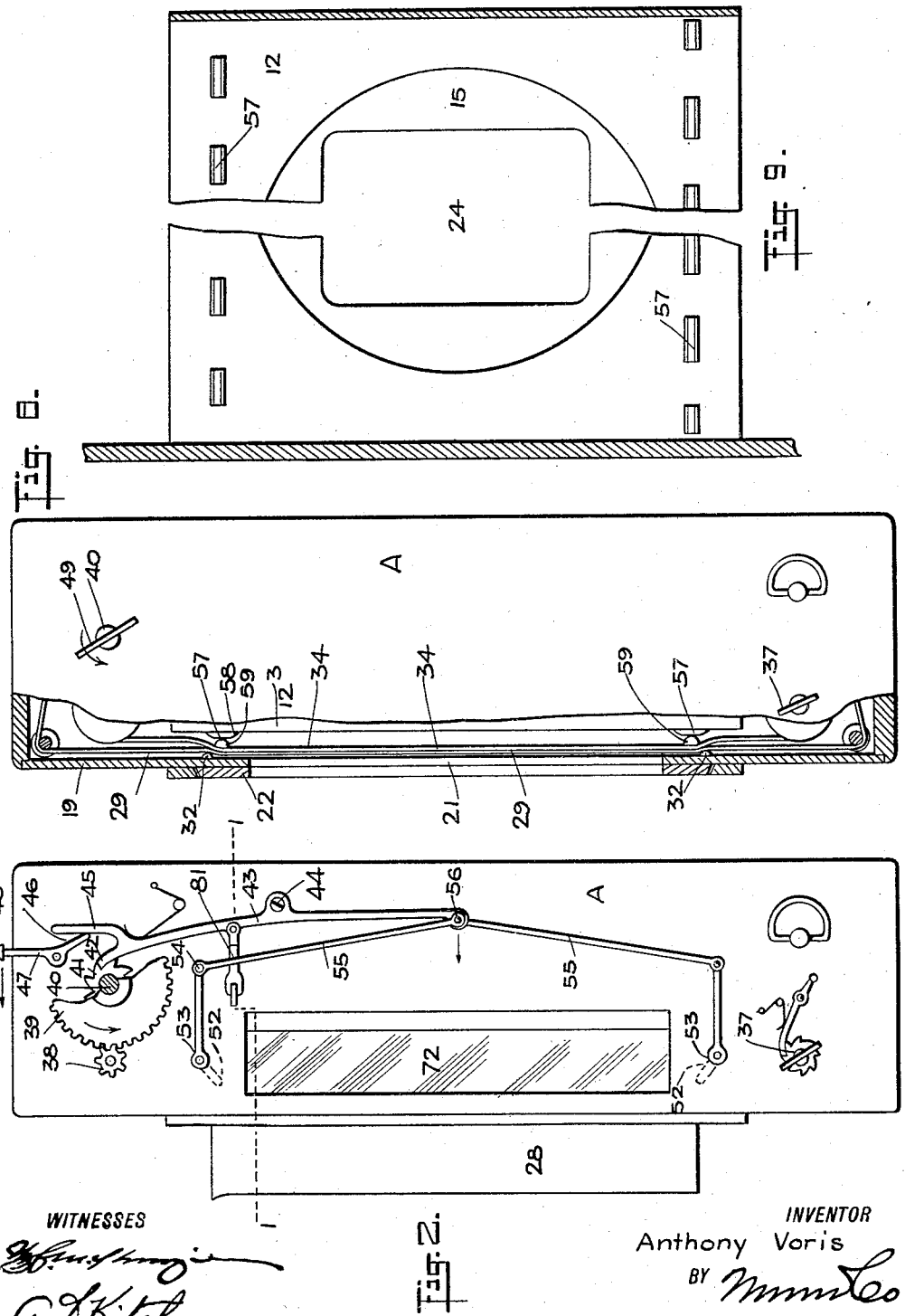

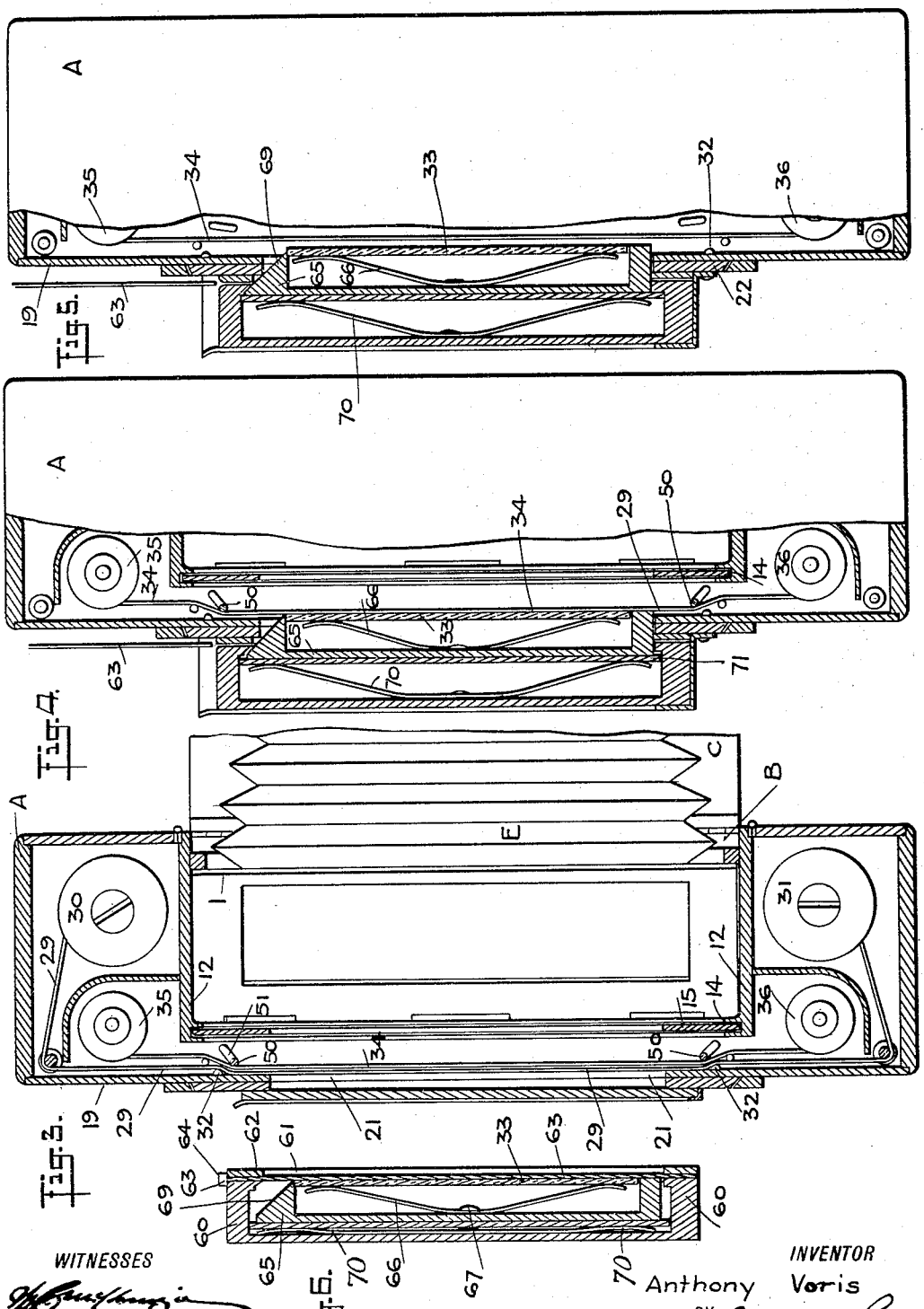

ANTHONY VORIS, OF NEW YORK, N. Y.

PHOTOGRAPHIC CAMERA.

1,146,218. Specification of Letters Patent. Patented July 13, 1915.

Application filed December 12, 1912. Serial No. 736,281.

*To all whom it may concern:*

Be it known that I, ANTHONY VORIS, a citizen of the United States, and a resident of the city of New York, borough of Manhattan, in the county and State of New York, have invented a new and Improved Photographic Camera, of which the following is a full, clear, and exact description.

My invention relates to a photographic camera and more particularly relates to the means for focusing the image on a screen disposed in the plane of the sensitive surface.

In the photographic art, it is necessary to view the image of an object on a screen in order to properly focus the same but when this screen has been removed in order to bring the sensitive plate into the optical axis, this sensitive surface is not in a position to obtain the clear image focused on the screen. One means for remedying this defect, is to move the lens itself backward a distance equal to the distance between the focusing screen and the sensitive plate, all as more fully described in my Patent No. 1,108,033, issued August 18, 1914. A method depending upon the movement of the lens relative to the plate involves an accurate adjustment of the parts and the employment of numerous working parts which are likely to get out of order. I have improved the previous means for accurately bringing the focused image on the sensitive plate by moving the sensitive surface into the plane previously occupied by the focusing screen, so that in focusing the image on the screen, it will occupy the same position on the sensitive surface.

A further object of my invention is to provide a means whereby a visual image on the focusing screen may be erected and magnified, or reduced so as to get a more brilliant image of smaller proportions.

A still further object of my invention is to provide a camera of simple construction and compact form and of a minimum number of parts.

Reference is to be had to the accompanying drawings, forming a part of this specification, in which similar characters of reference indicate corresponding parts in all the figures, and in which—

Figure 1 is a vertical longitudinal sectional view taken on the line 1—1 of Fig. 2; Fig. 2 is a top plan view looking down upon the device shown in Fig. 1 with the bellows collapsed and the top cap plate removed to show certain working parts; Fig. 3 is a horizontal sectional view taken centrally through the device shown in Fig. 1, with the front portion of the bellows omitted; Fig. 4 is a plan view looking down upon the camera, certain portions broken away to show the positioning of an improved form of plate holder thereon; and showing the focusing screen in position on the sensitive plate; Fig. 5 is a view similar to Fig. 4, but showing the focusing screen in its normal position; Fig. 6 is a vertical transverse sectional view through the loaded plate-holder detached from the camera; Fig. 7 is a front view on a reduced scale of the plate holder shown in Fig. 6; Fig. 8 is a top plan view of the camera, certain parts being broken away to show a modified means for bringing the focusing screen into the plane of the sensitive film; Fig. 9 is a rear elevation of the exposure opening frame.

In the several figures, I have shown a camera comprising a box or casing A having a forward opening B adapted to be closed by a hinged bed C and within which fits a stop frame D. A bellows E extends from the frame of the camera front F, as is customary with cameras of this general character. The front F is adjustably mounted upon a rack G, which rack is in turn mounted upon the bed C and is actuated through a pinion H to focus the camera. The rear of the bellows E is attached to a frame I pivoted to the camera A at J, the upper edge of which frame I is adapted to contact with the frame D so that the bellows in its extended position will not interfere with viewing the focusing of the image.

Formed integral with the bottom of the casing A and extending to a position spaced from the top, is a casing 12, which casing 12 has a circular opening 13 through the back thereof and concentrically disposed relative to the optical axis of the camera. The edge of the casing 12 outlining the opening, has a groove 14, within which groove is rotatably mounted a shutter 15.

The rear of the plate 22 is provided with an exposure opening 23 and also with a bracket 28 adapted to support a plate holder when the device is used as a plate camera, or if the device is used as a film camera, the film may be positioned in the space between the back 19 of the camera and the frame 12. In cases where the camera is used as a film camera, the sensitive film 29 passes through the exposure field of the camera between the back 19 and the casing 12 and is mounted upon the usual supply and take-up spools 30 and 31 disposed within the camera on opposite sides of the casing 12, as shown more particularly in Fig. 3, which sensitive film passes over buttons 32 extending inwardly from the back 19 on opposite sides of the opening 21, thereby affording means coacting with a device hereinafter described for moving the sensitive film in a plane parallel with the inner surface of the back 19, as said film moves across the opening 21. Also movable across the exposure field between the back 19 and the casing 12 and slightly in advance of the sensitive film 29, as shown in Fig. 3, and of the sensitive plate 33 shown in Figs. 4 and 5, is a focusing screen 34, which screen has its opposite ends mounted upon drums 35 and 36 resembling in construction the spools carrying the sensitive film and disposed on opposite sides of the casing 12 adjacent the spools 30 and 31. As is usual with screens of this character, they are drawn across the exposure field, which act places one of the spools carrying the screen under spring tension, so that in the act of taking the picture, the spring tension means permits the screen to move out of the field, permitting the exposure of the sensitive plate in the rear thereof. Usually this screen has an opening, not shown in the drawings, the size and configuration of which may control the amount of light admitted to the sensitive plate when said opening in the screen travels across the face of the sensitive surface. The part of the screen containing the opening is ordinarily wound on the drum 35 and is drawn on the spring-controlled drum 36 in taking the picture. The tension of the spring-actuating drum is controlled by tightening the spring through the medium of any suitable pawl-and-ratchet mechanism 37, as shown in Fig. 2.

The drum 35 is locked by the mechanism disclosed in the upper portion of Fig. 2, which mechanism comprises a pinion 38 rigidly mounted on the shaft carrying the drum 35, which pinion meshes with a gear wheel 39 carried on the shaft 40, said shaft also carrying a one-way ratchet 41, normally engaging the teeth of which ratchet is a nose 42 forming one end of a lever 43, which lever is pivoted intermediate its length by means of a screw 44, to the top of the camera A. Extending at a slight obtuse angle from the nose 42, is a finger 45, forming with the nose 42, a bifurcated end of the lever 43. Bearing on the finger 45 on the side opposite the nose 42, is one end 46 of a bell crank lever 47, which lever is suitably fulcrumed to the top of the camera A and has one arm extending outside of the camera, the extreme end of said arm being formed into a button 48. It will be seen by this construction that moving the button 48 in the direction indicated by the arrow, will swing the lever 43 on its fulcrum point 44, disconnecting the nose 42 from its connection with the ratchet 41, permitting the spring-tensioned drum 36 to draw the screen 34 on the drum 36, drawing the opening in the screen across the exposure field. The portion of the screen containing the opening may be rewound on the drum 35 by means of a key 49, shown in Fig. 8, which key is rigidly fastened to the shaft 40.

In constructions of this general character now in use, it is not possible to accurately focus the image on the sensitive plate by pre-focusing the same on the focusing screen, for, obviously, the focusing screen must be moved some material distance away from the sensitive plate and the image on the screen would not necessarily mean a clear cut image on the sensitive surface, due to the fact that the sensitive surface is at a greater distance from the lens than the focusing screen.

In one embodiment of my invention, I press the sensitive film out of its normal plane and place the front face of the sensitive screen in this plane while adjusting the lens to focus the same. One means, as disclosed in Figs. 2, 3 and 4, is to extend a rod 50 across the path of the screen 34 on opposite sides of the exposure opening on the back of the camera and between said opening and the buttons 32. Each end of the rod 50 is bent into a crank arm 51 which passes through an arcuate slot 52 in the adjacent side of the camera A and forms exteriorly of the camera, as shown in Fig. 2, one arm of a bell crank lever 53, the opposite arm of which lever is pivotally connected at 54 with one end of a reach rod 55, the opposite end of which is pivoted to the lever 43 on the end opposite the nose end 42. By this construction it will be seen that with the device in the position shown in Fig. 2, the rod 50 is in the position shown in Fig. 3, pressing the front face of the shutter 34 into the plane normally occupied by the sensitive film 29, but in the act of taking the picture, the lever 43 is swung on its pivotal point 44 moving the pivotal connection 56 in the direction indicated by the arrow, which movement communicated through the bell crank levers 53, swings the rods 50 out of engagement with the shutter 34 permitting the sensitive film to occupy the plane previously occupied by the screen 34.

A modified form of the arrangement is shown in Fig. 8, in which a short track 57 extends outwardly from the back of the casing 12 on opposite sides of the exposure opening, up the incline edges 58 of which track 57 slides projecting buttons 59 carried by the inner face of the shutter 34. These buttons are so placed relative to the buttons 32, that the combined thickness of the track 57 and buttons 59 is sufficient to cause the sensitive film 29 to be pressed around the button 32 and to bring the shutter 34 into the plane normally occupied by the sensitive film 29. Of course, the movement of the screen 34 will dismount the button 59 from the track 58, permitting the sensitive film 29 to resume its position in its normal plane.

In place of the flexible sensitive film hereinbefore described, I may make use of sensitive plates, the plates being positioned in a holder, as is common with devices of this character, and in this case, the focusing screen bears on the sensitive plate to shove the same back out of its normal position while focusing the picture on the screen.

In order to mount the sensitive plate so that it may be free to move out of its normal plane, I have devised a form of plate holder more particularly shown in Figs. 4, 5 and 6. This plate holder comprises a hollow frame 60, the front opening 61 of which is outlined by a rim 62, slidably mounted in which rim and closing the opening 61 is a shutter 63 having a head 64 external of the frame 60, by means of which the shutter 63 may be withdrawn from the plate holder when the plate is in position in the exposure opening, as shown in Figs. 4 and 5. Facing the opening 61 and bearing on the shutter 63 when in the closed position shown in Fig. 6, is the sensitive plate 33, which plate is maintained in its position against the shutter 63. The sensitive plate is contained within an inner frame 65 and rests upon the free ends of a pair of spaced-apart leaf springs 66 fastened by a pin 67 to the bottom of the frame 65 adjacent opposite sides thereof. The sensitive plate is maintained within this frame by means of a couple of diametrically-disposed eccentric buttons 68 shown in Fig. 7, or in any other suitable way. The upper ledge of the frame 65 has a beveled surface 69, which beveled surface is adapted to be engaged by the lower edge of the shutter 63 to force the inner frame 65 and the sensitive plate back into the frame 60, as shown in Fig. 6. The frame 65 carrying the sensitive plate is forced through the opening 61 in the frame 60 by means of a leaf spring 70 bearing on the back of the frame 65, to press the same forward, which forward movement is limited by the projecting flange 71 contacting with the inner face of the rim 62, as shown in Figs. 4 and 5. By this construction, it is seen that the sensitive plate 33 is resiliently mounted in the rear of the screen 34, so that when this screen is moved backward as hereinbefore described, it will displace the sensitive plate as shown in Fig. 4. The withdrawal of the screen 34, as shown in Fig. 5, permits the sensitive plate to occupy the plane previously occupied by the screen in focusing the camera. With the sensitive plate in the position shown in Fig. 5, the exposure is made, after which the insertion of the shutter 63 will withdraw the sensitive plate within the frame 60 and will protect the same from any extraneous light, then the plate holder may be removed as is common with devices of this character.

In order to view the image formed on the focusing screen, an opening 72 is made in the top of the camera, hinged to the rear edge of which opening and facing the same, is a mirror 73, which mirror also acts as a shutter to close a rear opening 74, the lower edge of said mirror resting in a pocket 75 on the upper edge of the casing 12.

Positioned on the forward upper edge of the casing 12 and bridging the space to the top of the camera A, is a magnifying or reducing lens 75, and positioned on the side of the lens 76 opposite the mirror 73, is a second mirror 77 positioned on the back of a door 78, said mirror 77 facing the focusing screen 34, so that the image is reflected from this screen to the mirror 77, from the mirror 77 to the mirror 73, out through the opening 72, the image being magnified or reduced by means of the lens 76 disposed between the two mirrors 77 and 73. By raising the mirror 73 the observer may look into the rear opening 74 through the lens 76 to directly view the reflected image on the mirror 77 reflected from the screen.

In order to close the openings 72 and 74 from the infiltration of extraneous light at the moment of taking the picture, the door 78 is pivotally mounted at 79, at its upper edge, to the under side of the top of the camera A, and is adapted to swing from the full-line position shown in Fig. 1 to the dotted-line position in advance of the lens 76 to close the exposure field of the camera from light passing through the openings 72 and 74. One means for swinging the door 76 into its closed position as indicated in Figs. 1 and 2, is to extend from the door on the opposite side of the pivot 79, a bent extension 80, which extension is adapted to be engaged by one end of an arm 81, the opposite end of which is suitably pivoted to the lever 43 hereinbefore described. It will be noted that the act of releasing the focusing screen and in releasing the holding means for this screen, the arm 81 swings the door 78 into its closed position. In order to protect the mechanism as shown in Fig. 2, a casing 82, shown in section in Fig. 1, is mounted on the top of the camera.

Having thus described my invention, I claim as new and desire to secure by Letters Patent:

1. In a camera, in combination, a lever pivoted intermediate its length having a bifurcated end, one side of said bifurcated end constituting a pawl and the other side a finger, a focusing screen, the free ends of which are mounted on drums, means for locking one of said drums, said means including a ratchet normally engaged by said pawl, a pair of rods disposed on opposite sides of the exposure opening of the camera and adapted to move said screen into the position normally occupied by the sensitive member, each end of each rod having affixed thereto one arm of a bell crank lever, a reach rod connected to the other arm of said bell crank lever, said rods pivoted to said lever at the end opposite the bifurcated end, and an actuating lever engaging said finger whereby a movement of said actuating lever will draw said pawl from said ratchet to permit the actuation of the screen and simultaneously withdraw said rods from said screen.

2. In a camera, a flexible focusing screen, means for resiliently supporting a sensitized surface in the rear of said screen, an eccentrically mounted member for simultaneously moving said surface and said screen, to the rear in focusing the camera, and means for moving said screen away from said surface in making an exposure on the same.

3. In a camera having an exposure opening, a flexible screen disposed across said opening, means on opposite sides of said opening engaging said screen to position the portion of the screen bridging said opening, adjacent to the same and adjustable means for moving said screen in a direction parallel with the axis of the lens of the camera.

4. In a camera having an exposure opening, a flexible screen disposed across said opening, eccentrically movable means on opposite sides of said opening engaging said screen to position the portion of the screen bridging said opening adjacent to the same, and means for resiliently mounting a sensitive member in said opening, said means being adapted to move in a direction parallel with the axis of the lens of the camera.

5. In a camera having an exposure opening, a screen disposed across said opening, means for supporting said screen, means for moving said screen from the position in which it is normally supported to a focusing position, a mirror arranged adjacent one end of the screen for reflecting an image therefrom, means co-acting with said mirror for receiving and reflecting said image to an opening in the camera, and resilient means for supporting a sensitive body back of said screen, said resilient means and the sensitive body supported thereby being displaced when said screen is moved to a focusing position.

6. In a camera having an exposure opening, a flexible screen adapted to be positioned across said opening, the ends of said screen being mounted on spring-controlled drums, a pawl-and-ratchet connection for holding one of said drums under tension, means acting on said screen to move the same into its focusing position, said means including the pawl of the pawl-and-ratchet connection, and means whereby the actuation of said first-mentioned means will automatically release the pawl-and-ratchet connection and permit the screen to move away from its focusing position.

7. In a camera, an outer casing, an inner casing arranged in said outer casing and spaced from the back of the same, means for supporting a sensitive body adjacent the back of the camera, a focusing screen disposed between said inner casing and the back of the camera, and eccentrically mounted means carried by the outer casing for automatically moving said screen into a position normally occupied by said sensitive body, and simultaneously moving said sensitive body toward the back of the camera.

8. A camera having a casing therein positioned from the back of the same, means for supporting a sensitive body adjacent the back of the camera, a focusing screen disposed between said casing and the back of the camera, and a manually operated movable member acting on the screen adapted to move said screen into the position normally occupied by the sensitive body, and to simultaneously move said sensitive body toward the back of the camera.

9. A camera having a casing, means for supporting a sensitive body in said casing, a focusing screen, means acting on said focusing screen for causing said sensitive body to be moved so that the screen will be in position for receiving correctly the focus, and means for automatically acting on said sensitive body for moving the same to the position occupied by said screen when said screen is removed for exposing the sensitive body.

10. In a camera having an exposure opening, a screen disposed across said opening, means for supporting said screen, means for moving said screen from the position in which it is normally supported to a focusing position, a mirror arranged adjacent one end of the screen for reflecting an image therefrom, and means co-acting with said mirror for receiving and reflecting said image to an opening in the camera, and means for supporting a sensitive body back of said screen.

In testimony whereof I have signed my name to this specification in the presence of two subscribing witnesses.

ANTHONY VORIS.

Witnesses:
C. L. LUEDTKE,
JAMES F. MACKEY.

Copies of this patent may be obtained for five cents each, by addressing the "Commissioner of Patents, Washington, D. C."